United States Patent
Larson et al.

(10) Patent No.: US 7,400,252 B2
(45) Date of Patent: Jul. 15, 2008

(54) WIRELESS MONITORING OF COMPONENT COMPATIBILITY IN AN ELECTRONICS SYSTEM

(75) Inventors: Thane Michael Larson, Roseville, CA (US); Christopher Gregory Malone, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 11/170,921

(22) Filed: Jun. 30, 2005

(65) Prior Publication Data

US 2007/0001837 A1    Jan. 4, 2007

(51) Int. Cl.
    *G08B 13/14*    (2006.01)
(52) U.S. Cl. .................. 340/572.1; 340/10.51; 709/224
(58) Field of Classification Search .............. 340/572.1, 340/5.72, 572.4, 562, 10.1, 10.51, 613.9, 340/539.1, 505; 709/203, 224 X; 455/558
    See application file for complete search history.

(56) References Cited

U.S. PATENT DOCUMENTS

| | | | |
|---|---|---|---|
| 5,629,981 A | 5/1997 | Nerlikar | |
| 5,907,491 A | 5/1999 | Canada et al. | |
| 5,960,085 A | 9/1999 | de la Huerga | |
| 6,070,240 A | 5/2000 | Xydis | |
| 6,154,137 A | 11/2000 | Goff et al. | |
| 6,172,596 B1 | 1/2001 | Cesar et al. | |
| 6,401,209 B1 | 6/2002 | Klein | |
| 6,487,180 B1 * | 11/2002 | Borgstahl et al. ........... | 370/310 |
| 6,747,560 B2 | 6/2004 | Stevens, III | |
| 6,813,209 B2 | 11/2004 | Crain et al. | |
| 6,825,754 B1 | 11/2004 | Rolin | |
| 6,832,251 B1 | 12/2004 | Gelvin et al. | |
| 6,838,989 B1 | 1/2005 | Mays et al. | |
| 6,839,776 B2 * | 1/2005 | Kaysen ........................ | 710/36 |
| 6,842,121 B1 | 1/2005 | Tuttle | |
| 2002/0113850 A1 * | 8/2002 | Wheeler et al. ............... | 347/85 |
| 2003/0046339 A1 | 3/2003 | Ip | |
| 2003/0114104 A1 | 6/2003 | Want et al. | |
| 2005/0061318 A1 * | 3/2005 | Faram ................... | 128/204.18 |
| 2005/0114718 A1 * | 5/2005 | Ito ............................. | 713/300 |

FOREIGN PATENT DOCUMENTS

| | | |
|---|---|---|
| GB | 2286948 | 2/1995 |
| WO | WO 2004/006051 | 1/2004 |
| WO | WO 2005/001642 | 1/2005 |

OTHER PUBLICATIONS

Want, Roy, "Enabling Ubiquitous Sensing with RFID," Computer, Invisible Computing, pp. 84-86, (Apr. 2004).
National Semiconductor Corporation, "LM79 Microprocessor System Hardware Monitor," DS100036, pp. 1-30, (2001). <www.national.com>.

(Continued)

*Primary Examiner*—Brent Swarthout

(57) ABSTRACT

An electronics system comprises a frame including a first wireless communicator and at least one component associated with the electronics system. The at least one component includes a second wireless communicator. A manager of the electronics system is in wired communication with the first wireless communicator and configured for determining a compatibility of the at least one component with the electronics system via wireless communication between the first wireless communicator and the second wireless communicator.

11 Claims, 6 Drawing Sheets

OTHER PUBLICATIONS

National Semiconductor Corporation, "Thermal Management Products," Selection Guide, pp. 5, (Fall 2004).
Gilbert, Alorie, "HP puts RFID on the Rack", CNET News, (2 pgs.), (Nov. 1, 2004), <http://news.zdnet.co.uk>.
Aviation Today, "RFID: The Future of MRO Supply Chain Management", pp. 1-8, (Feb. 2, 2005), <www.aviationtoday.com>.
RFID Journal, "New Low-Cost Temperature Sensor", (2 pgs.), (Feb. 11, 2005), <www.rfidjournal.com>.
Comparetti, Alfredo Milani, SpeedFan, "Access Temperature Sensor in your Computer", (3 pgs.), (2000-2005), <www.almico.com>.
DarkVision Hardware, "Motherboard Monitor 5", (4 pgs.), (Feb. 11, 2005), <www.dvhardware.net>.

* cited by examiner

WIRELESS MONITORING OF COMPONENT COMPATIBILITY IN AN ELECTRONICS SYSTEM

CROSS-REFERENCE TO RELATED APPLICATIONS

This application is related U.S. patent application Ser. No. 11/171,140, entitled "WIRELESS MONITORING FOR AN ELECTRONICS SYSTEM"; and U.S. patent application Ser. No. 11/170,875, entitled "WIRELESS TEMPERATURE MONITORING FOR AN ELECTRONICS SYSTEM"; both filed Jun. 30, 2005, and both of which are incorporated herein by reference.

BACKGROUND

Electronics systems maintain an intricate balance of between the many varied components of the system. Many different factors affect compatibility of the components, including physical compatibility of size, shape, connections, etc., as well as electrical compatibility of power, current, and various electrical operating characteristics of each component. Moreover, certain components, such as power units and cooling units, are matched to handle the number, size, and type of circuitry components of the electronics system.

During design and manufacture of an electronics system, the compatibility of components of the electronics system is optimized to meet the performance goals for the electronics system. However, as electronics systems age and new components are developed or improved, there is desire to upgrade one or more components of the electronics system. Whenever an original component of an electronics system is removed and replaced with a different component, which typically has more advanced performance characteristics and somewhat different power/current demands, a question arises regarding the compatibility of the new component with the original electronics system. In many cases, the new component is being added by a consumer or other technician who is unfamiliar with the performance constraints of the electronics system that affect whether or not the replacement component is compatible with the electronics system.

Whether assembling a new electronics system or modifying an existing electronics system, installing the wrong component can compromise performance of the electronics system. In more serious case, the wrong component can prevent operation of the electronics system and/or seriously damage the component and/or electronics system.

Accordingly, installing replacement components in an electronics system poses significant performance issues affecting the health of the electronics system.

SUMMARY

Embodiments of present invention are directed to wireless monitoring of component compatibility for an electronics system. In one embodiment, an electronics system comprises a frame including a first wireless communicator and at least one component associated with the electronics system. The at least one component includes a second wireless communicator. A manager of the electronics system is in wired communication with the first wireless communicator and configured for determining a compatibility of the at least one component with the electronics system via wireless communication between the first wireless communicator and the second wireless communicator.

DETAILED DESCRIPTION

Figure 1:
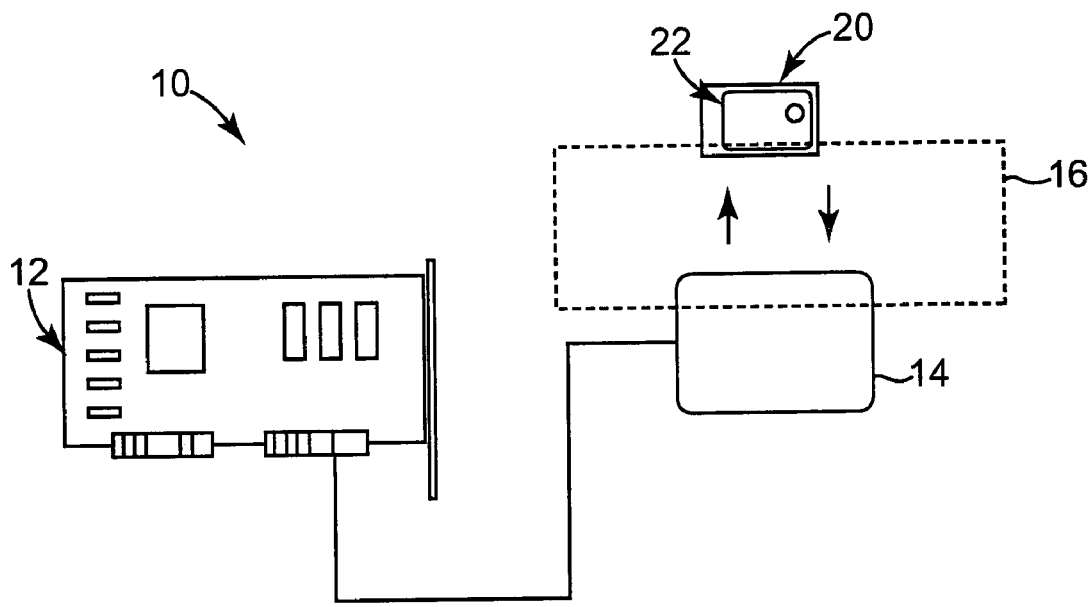
FIG. 1 is a plan view schematically illustrating a RFID system, according to an embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to wireless monitoring of an electronics system. One embodiment is directed to monitoring parameters of components of a computer system, as well as monitoring a configuration of the computer system as a whole. In another embodiment, the electronics system comprises electronic circuitry arranged to provide functions other than computing, such as measurement, sensing, audio, video, control, automation, and many other functions achieved through a system of electronic components acting together.

Wireless monitoring greatly simplifies evaluation of components of an electronics system because it provides a communication pathway independent of other electrical connections forming the electronics system. In one embodiment, a RFID transponder is disposed on select components of the electronics system, which then communicate via radiofrequency signals with a RFID transceiver disposed within or on the electronics system. Each RFID transponder stores information about one or more parameters of the component on which it is disposed and/or communicates information from a sensor (associated with the transponder) that detects such parameters regarding the component. In one embodiment, an RFID transponder additionally enables tracking of a component through factory production, distribution, transportation, etc.

Each RFID transponder is placed on an exterior of components of the electronics system, so as not to occupy valuable space within the component. In one embodiment, a RFID transponder is formed as a tape or thin card adhesively secured to the exterior of the component, thereby enabling simple, robust attachment of the RFID transponder to a component. Moreover, because each transponder communicates wirelessly with a RFID transceiver, no wired pathway passes through the component. Accordingly, each component of an electronics system need not be modified to accommodate this wireless monitoring technique.

In still another embodiment, a RFID transponder is located on an interior of a component (i.e., integrated within the component) when space permits, as might be available in larger components.

Via wireless monitoring of components, simpler more effective ways to manage an electronics system are enabled. In one example, communication between a RFID transceiver of the electronics system and the RFID transponder of each component is used to insure that an electronics system has been proper assembled into the configuration intended by the manufacturer and/or ordered by a customer. This verification of the configuration of the electronics system is performed electronically, instead of or in addition to a physical inspection of the configuration of the assembled electronics system.

In another example, information about the electronics system, and its specific components, is gathered via the RFID transponders and the RFID transceiver to facilitate maintenance and repair of one or more components of the electronics system.

In another embodiment, a manager of the electronics system comprises an integrity monitor configured to insure compatibility of components with the electronics system. In one aspect, the integrity monitor identifies information regarding various operating characteristics or performance specifications of a new component to be added to the electronics system. This information is stored in a memory of a RFID transponder on the new component and obtained from the memory by the manager via interrogation from a RFID transceiver of the electronics system. The component is physically installed into the electronics system and then the manager checks the compatibility of the component. If the new component matches predetermined performance criteria of the electronics system, then the manager enables operation of the component within the electronics system and allowing the new component to be "powered-up". If the new component does not match predetermined performance criteria of the electronics system, then the manager prevents operation of the component within the electronics system and prevents the new component from being "powered-up".

In another embodiment, a compatibility of a new component with the electronics system is checked prior to physically installing the component into the electronics system. If there is an incompatibility, the manager warns an operator not to physically install the new component to insure no damage will be done to the electronics system. This feature reduces the chance of providing power to an incompatible component within the electronics system.

Accordingly, embodiments of the invention enable new ways of monitoring electronics systems and their components via wireless communication pathways, as well insuring the integrity of the electronics system from incompatible components. In particular, an RFID transponder tag with a sensor is secured to a conventional industry standard component that does not have an integrated sensor, such as a power sensor, temperature sensor, etc. This implementation allows the use of low-cost components and avoids the cost and complexity of integrating sensors into these components. By using wireless communication pathways (via a RFID transponder tag and RFID transceiver), these components and a larger system can be monitored and controlled to meet enterprise IT equipment reliability goals. Embodiments of the invention are described and illustrated in detail in association with FIGS. 1-6.

In one embodiment of the invention, a wireless communication pathway is established via radiofrequency waves, and in particular via a radiofrequency identification (RFID) system. Accordingly, one exemplary embodiment of a RFID system is described and illustrated in association with FIGS. 1-2 as a foundation for a description of wireless monitoring of electronics systems, as described and illustrated in association with FIGS. 3-6.

FIG. 1 illustrates radio frequency identification (RFID) system 10. RFID system 10 includes transceiver 12 and transponder 20. Transceiver 12 includes transceiver antenna 14. Transponder 20 includes transponder antenna 22. Signals generated by transceiver antenna 14 and by transponder antenna 22 are transferred through medium interface 16.

Transceiver 12 of RFID system 10 is configured to communicate with transponder 20. In one embodiment, transceiver 12 includes a microprocessor, and in another embodiment, transceiver 12 is coupled to a host system that includes a microprocessor. In one embodiment, transceiver antenna 14 is integrated within a single transceiver device. In one embodiment, transceiver 12 includes a separate transceiver circuit device and a separate transceiver antenna 14. Transceiver antenna 14 emits radio frequency signals that are transmitted through medium 16 to activate transponder 20. After activating transponder 20, transceiver 12 reads and writes data to and from transponder 20. Transceiver antenna 14 and transponder antenna 22 are the conduits between transceiver 12 and transponder 20, and communicate radio frequency signals through medium interface 16.

In some embodiments, medium interface 16 is air, and in other embodiments medium interface 16 includes air and other materials. Transceiver antenna 14 and transponder antenna 22 can be of a variety of shapes and sizes, dependent upon the anticipated distance separating them, the type of medium 16 that is between antennas 14 and 22, and on other factors.

Transceiver 12 typically performs a variety of functions in controlling communication with transponder 20. In one case, transceiver 12 emits output signals from transceiver antenna 14, thereby establishing an electromagnetic zone for some distance adjacent antenna 14. When transponder 20 passes through the electromagnetic zone established by transceiver antenna 14, transponder 20 detects an activation signal from transceiver 12. Transponder 20 typically has integrated circuits that include data that is encoded in memory. Once transponder 20 is activated with the activation signal, transceiver 12 decodes data that is encoded in transponder 20. For instance, in one embodiment transceiver 12 performs signal conditioning, parody error checking and correction.

Typically, transceiver 12 emits radio waves in ranges from a few millimeters up to hundreds of feet or more, depending on its output power and upon the radio frequency used. In one case, transceiver 12 is integrated in a circuit board card that is then coupled to a host computer, which processes the received data and controls some of the communication with transponder 20.

Figure 2:
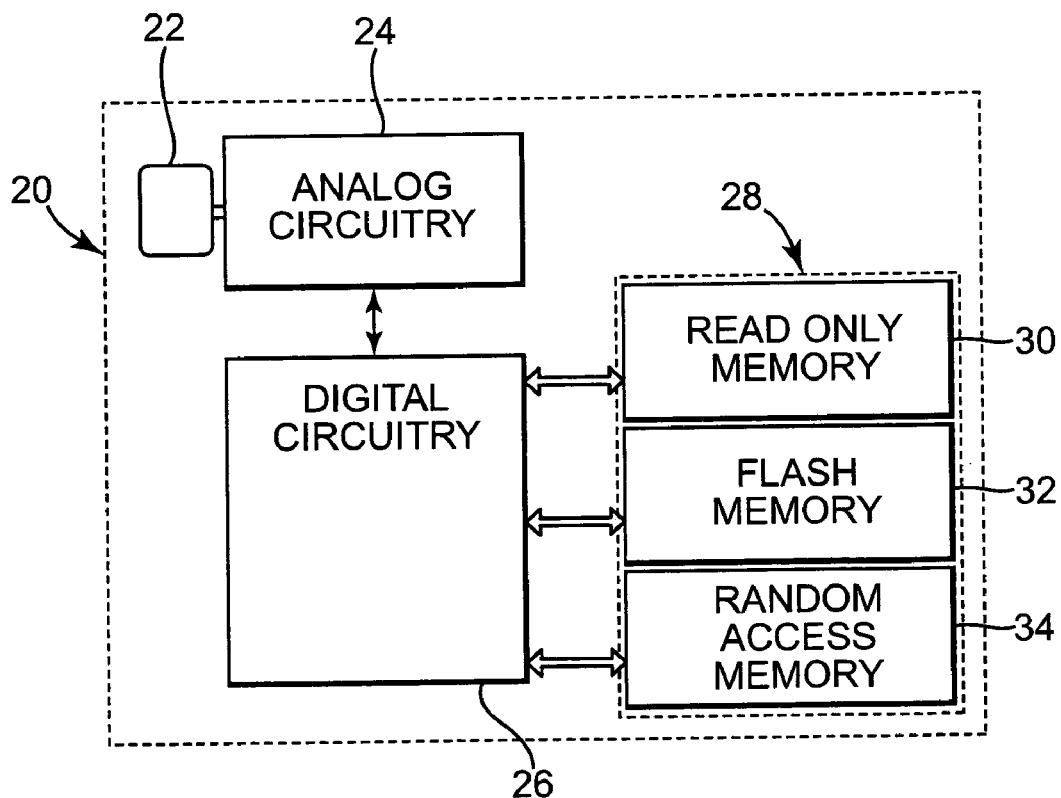
FIG. 2 is a block diagram of a transponder of a RFID system, according to an embodiment of the invention.

FIG. 2 illustrates one embodiment of transponder 20. In one case, transponder 20 includes transponder antenna 22, analog circuitry 24, digital circuitry 26, and memory 28. In various embodiments, memory 28 can include read only memory (ROM) 30, flash memory 32, and/or random access memory (RAM) 34.

Transponder 20 comes in a variety of shapes and sizes for use in a variety of applications. In one embodiment, transponder 20 is a tag, thin card, or tape that is securable to the component of the computer system. In one aspect, the transponder 20 is adhesively securable to the component. In other embodiments, transponder 20 is configured as a small cylindrical-shaped tube, screw-shaped (such that it is securable into a circuit board), or credit-card shaped, each of which are securable to a component of the computer system.

In some embodiments, transponder 20 includes one or more types of memory 28. For example, in some embodiments memory 28 includes ROM 30 to accommodate security data and operating system instructions that are employed in conjunction with analog circuitry 24 and digital circuitry 26 to control the flow of data within transponder 20. In other embodiments, memory 28 includes RAM 34 to facilitate temporary data storage during a time period when transceiver 12 is interrogating transponder 20 for a response. In other embodiments, memory 28 includes flash memory 32 to store data in transponder 20 that is non-volatile in order to ensure that the data is retained when transponder 20 is in a quiescent or power saving state. In some embodiments, memory 28 includes other types of non-volatile programmable memory, such as programmable read-only memory (PROM), erasable programmable read-only memory (EPROM), and electrically erasable programmable read-only memory (EEPROM). Any one of memory types ROM 30, flash memory 32 (or other non-volatile programmable memory), or RAM 34 can be used, or any combination thereof can be used.

In one embodiment, transponder 20 is an active transponder device. An active transponder is powered by an internal energy source, such as a battery configured within analog circuitry 24. Such active transponders are typically "read/write," which means data stored within memory 28 of transponder 20 can be rewritten and/or modified. An active transponder can also be powered from an existing source in another electronic device. For example, where transponder 20 is an active transponder coupled within a computer system, the power supply within the computer system supplies power to the transponder.

In one embodiment, transponder 20 is a passive transponder device. Passive transponders operate without a separate internal power source and obtain operating power from transceiver 12. Rather than having a battery within analog circuitry 24, for example, passive tags instead can use a strongly capacitive circuit and a charge pump within analog circuitry 24. The capacitive circuit and charge pump are configured to receive radio frequency energy from transceiver 12 and store it for use within transponder 20, for example, to control digital circuit 26 and memory 28.

Since active transponders accommodate an internal battery, they are typically larger in size than passive transponders. Memory size within an active transponder varies, but can be fairly significant with some systems operating, for example, with up to a megabyte or more of memory. Active transponders also typically have a longer ready range such that transceiver 12 and transponder 20 are typically placed apart at greater distances than in the case of passive transponders. In the same way, passive transponders typically have shorter read ranges, but are typically much smaller and lighter than active transponders and are typically less expensive.

In addition to including a battery for active transponders or capacitive circuit and charge pump for passive transponders, analog circuitry 24 typically include interface circuits for data transfer between transponder antenna 22 and digital circuitry 26. Digital circuitry 26 in turn typically includes control logic, security logic, and internal logic or microprocessor capabilities. This control logic controls the flow of data to and from memory 28.

Accordingly, transceiver 12 and transponder 20 together establish a robust wireless communication pathway or network adaptable to a variety of environments.

According to one embodiment of the invention, transceiver 12 and one or more transponders 20 are arranged within an electronics system to enable wireless monitoring of an electronics system, such as computer system 100 and its components. In another embodiment, the electronics system comprises electronic circuitry arranged to provide functions other than computing, such as measurement, sensing, audio, video, control, automation, and/or many other functions achieved through a system of electronic components acting together.

Figure 3:
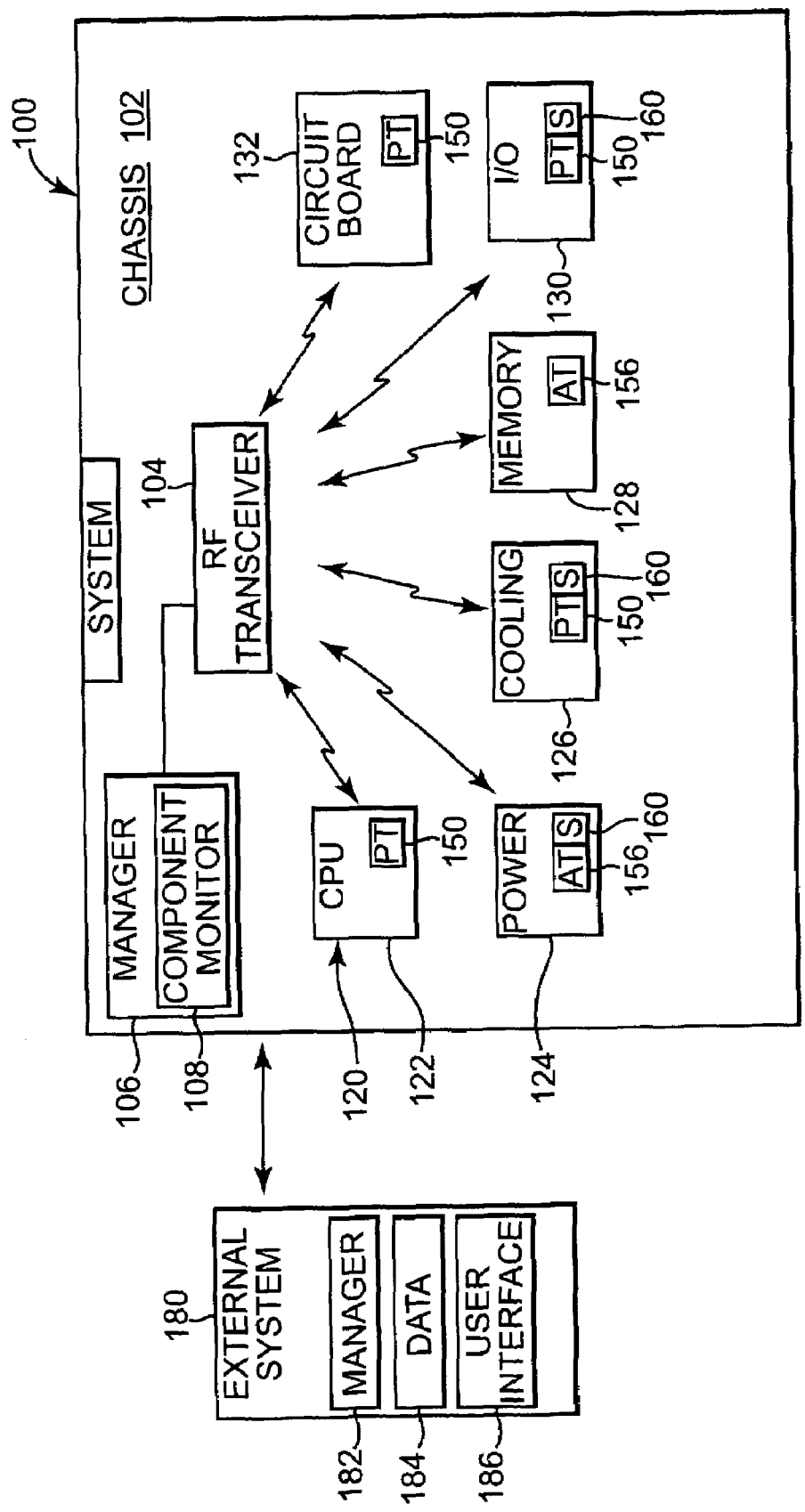
FIG. 3 illustrates an electronics system, according to an embodiment of the invention.

FIG. 3 is a block diagram of computer system 100 including one such wireless monitoring mechanism, according to one embodiment of the invention. As shown in FIG. 3, computer system 100 comprises chassis 102, RFID transceiver 104, manager 106 with component monitor 108, and array 120 of components 122-132. These components of array 120 include, but are not limited to, central processing unit (CPU) 122, power unit 124, cooling unit 126, memory 128, input/output 130, and circuit board 132. One or more components of array 120 also comprise passive transponder (PT) 150 or active transponder (AT) 156. In addition, in one embodiment, one or more of the passive transponder(s) (PT) 150 or active transponder(s) (AT) 156 comprise sensor 160. Transponders 150, 156 have substantially the same features and attributes of transponder 20, and transceiver 104 has substantially the same features and attributes as transceiver 12, previously described and illustrated in association with FIGS. 1-2. Sensor 160 is further described and illustrated in association with FIG. 4.

As shown in FIG. 3, chassis 102 is a frame or other portion of a framework supporting array 120 of components 122-132 and transceiver 104. Manager 106 comprises an on-board manager for monitoring and controlling operation of components 122-132 of computer system 100, and is in wired communication with transceiver 104. In one aspect, manager 106 comprises a server manager when computer system 100 comprises a server. Component monitor 108 of manager 106 enables monitoring specific parameters of each component of computer system 100, and is further described and illustrated in association with FIG. 5.

Passive transponder 150 and active transponder 156 convey information to manager 106 via transceiver 104 about a component (on which they are secured or adjacent to) such as one or more parameters of the component. The information is either stored in a memory (e.g., memory 28, FIG. 1-2) of transponder 150, 156 or detected via sensor 160 for transmission to transceiver 104. In one embodiment, information detected by sensor 160 is stored in a memory of transponder 150, 156 for later communication to transceiver 104.

The parameters of the components of computer system 100 reveal information about a specific condition, operating characteristic, or specification of the component. When this information is collected from several different components via manager 106, information about the entire computer system 100 is available for use to monitor computer system 100. Accordingly, a variety of transponders, either active or passive, and with or without sensors, is applied to components of a computer system to create a wireless network for monitoring the computer system.

As shown in FIG. 3, in one embodiment central processing unit 122, cooling unit 126 (e.g., a cooling fan, system fan, etc), input/output unit 130, and circuit board 132 each include passive transponder 150. In one embodiment, passive transponder 150 further comprises sensor 160, as illustrated for cooling unit 126 and input/output unit 130. In another embodiment, passive transponder 150 does not include a sensor, such as sensor 160, as illustrated for central processing unit 122, and circuit board 132.

In one embodiment, power unit 124 and memory 128 comprise active transponder 156 without a sensor 160. In another embodiment, active transponder 156 also comprises sensor 160, as is illustrated for power unit 124. In another embodiment, memory 128 comprises passive transponder 150 with a sensor 160.

In one embodiment, active transponder (AT) 156 comprises a larger memory than a memory of passive transponder (PT) 156 and the ability for transceiver 104 to write information to active transponder (AT) 156 regarding a parameter of a component or the computer system.

In one embodiment, sensor 160 is incorporated into transponder(s) 150, 156 while in other embodiments, sensor 160 is external to transponder(s) 150, 156 but in communication with, and associated with a respective transponder 150, 156.

In still other embodiments, other combinations of passive transponders (PT) 150, active transponder(s) 156, and sensor(s) 160 are used on components so that the wireless communication network of transponders 150, 156 and transceiver 104 is not limited to the example shown in FIG. 3. Any component can have either a passive transponder 150 or an active transponder 156, and may or may not have a sensor 160. Selection of which type of transponder 150, 156 is used, and whether or not a sensor 160 is included, depends on the type of component being monitored, as well as the type of information or parameters being monitored.

As shown in FIG. 3, transceiver 104 is disposed within or on chassis 102 of computer system 100 in range for communication with transponders 150, 156. Accordingly, each transponder 150, 156 is in wireless communication with transceiver 104. Because the communication between transponders 150, 156 and transceiver 104 is performed via radiofrequency waves, this wireless communication occurs independent of physical wires or conductive trace paths between the components (122-132) on chassis 102 and manager 106 or transceiver 104. Moreover, transponders 150, 156 are not formed as part of the computer components, thereby avoiding modification of those components to implement the wireless communication network. Accordingly, transponders 150, 156 enable a communication pathway that does not occupy pins or conductive pathways within components (120-132) nor on chassis 102 or any circuit boards supporting components 120-132.

In one embodiment, transceiver 104 obtains its power from a source (e.g., an internal battery) different than components of computer system so that the independent communication pathway of transceiver 104 and transponders 150, 156 enable wireless monitoring of components of computer system 100 even when computer system 100 is not powered up. This feature enables verifying a configuration of computer system 100, or a compatibility of a component with computer system 100, prior to power being supplied to the components of the computer system 100.

Accordingly, transponders 150, 156 and transceiver 104 enable an wireless communication network that is transparent to the normal function and operation of components of the computer system, and which is easily implemented by simply securing the transponders to a component for which monitoring is desired.

As shown in FIG. 3, in one embodiment, computer system 100 is in communication with external computer system 180, which includes manager 182, data module 184, and user interface 186. User interface 186 is configured to display and enable operation of manager 182 of external system 180 and/or of manager 106 of computer system 100. In one embodiment, manager 182 is configured to manage operations of a plurality of computer systems, including computer system 100, so that manager 182 acts as a central monitoring station of several computer systems, each of which have their own wireless monitoring mechanism.

Figure 4:
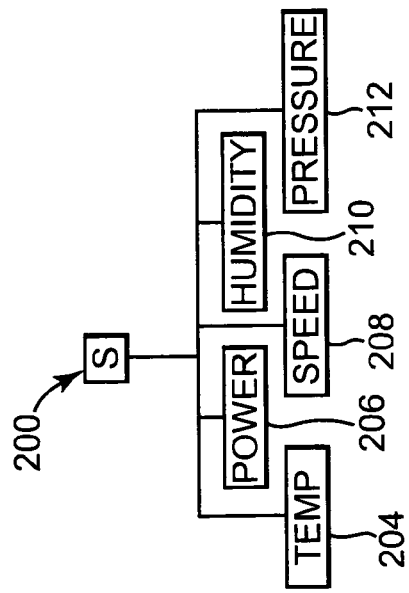
FIG. 4 is a block diagram schematic illustrating a sensor, according to an embodiment of the invention.

FIG. 4 is an illustration of different types of sensors used with transponder 150, 156, according to one embodiment of the invention. As shown in FIG. 4, sensor 200 represents any one of sensors 160 in FIG. 3. Sensor 200 comprises one or more of temperature sensor 204, power sensor 206, speed sensor 208, humidity sensor 210, and pressure sensor 212. Not every sensor is appropriate for each component of computer system 100 (FIG. 3), so that appropriate types of sensors are associated with components for which the sensor can detect a parameter appropriate for that component. Temperature sensor 204 is configured to detect an air temperature and/or a temperature of a component. Power sensor 206 is configured to detect power consumption of a component or system while speed sensor is configured to detect an operational speed of a component such as a processing speed or fan speed. Humidity sensor 210 is configured to detect a humidity within an area surrounding a component while pressure sensor 212 is configured to detect a barometric pressure or a mechanical pressure affecting a component and/or the electronics system as a whole.

Figure 5:
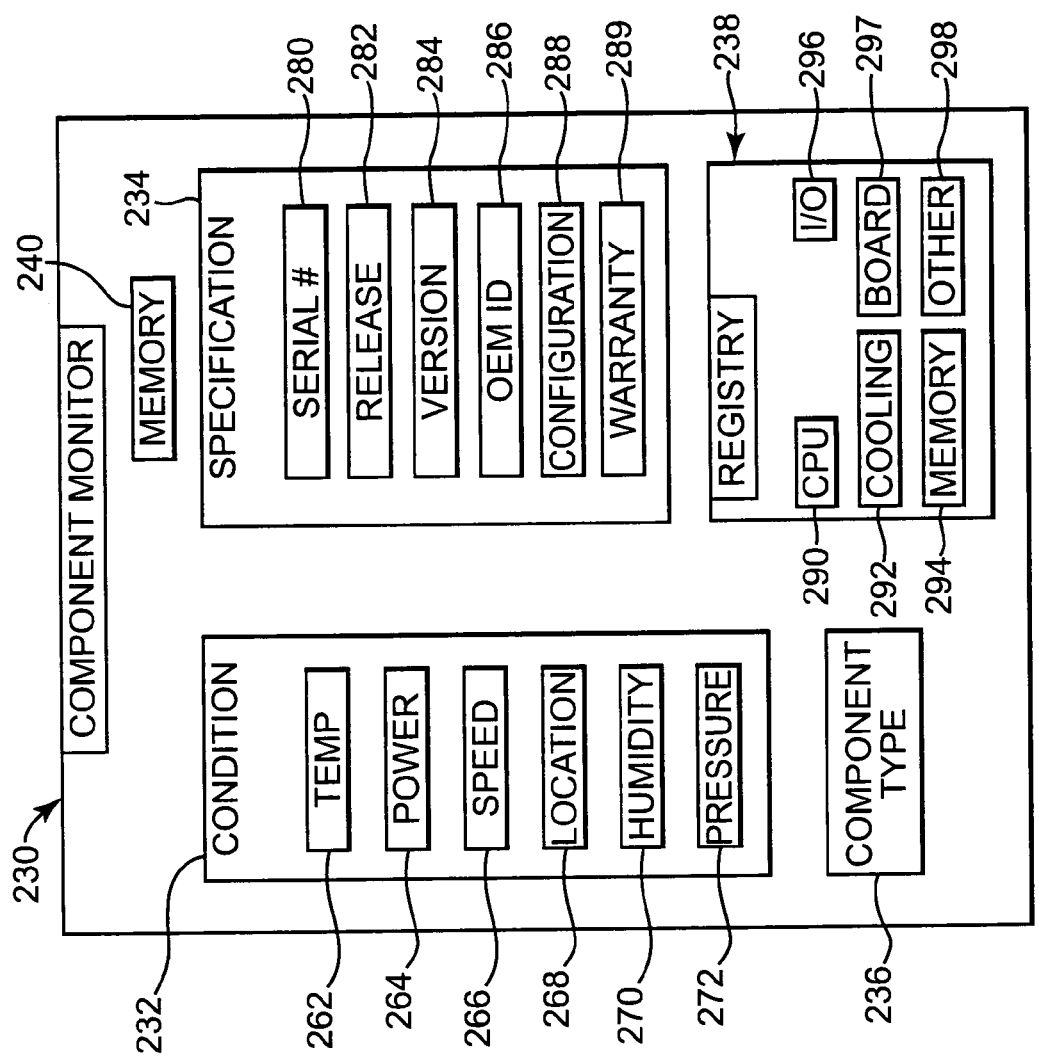
FIG. 5 is a block diagram of a component monitor, according to an embodiment of the invention.

FIG. 5 is a block diagram of component monitor 230, according to one embodiment of the invention. Component monitor 230 is configured to facilitate monitoring parameters of the components of computer system 100, and has substantially the same features and attributes as component monitor 108 of manager 106 (FIG. 3), and addition features described herein.

As shown in FIG. 5, component monitor 230 comprises condition parameters module 232, specification parameters module 234, component type parameter 236, registry 238, and memory 240. Condition parameter module 232 comprises temperature parameter 262, power parameter 264, speed parameter 266, location parameter 268, humidity parameter 270, and pressure parameter 272.

Specification parameters module 234 of component monitor 230 comprises one or more parameters that act an origin identifier to specify a date, manufacturer or other information indicating something about an origin of a component. In one embodiment, specification parameter module 234 comprises serial number parameter 280, release date parameter 282, version parameter 284, original equipment manufacturer (OEM) identifier (ID) 286, configuration parameter 288, and warranty parameter 290.

Memory 240 comprises firmware, hardware, internal and/or external media devices used to store component monitor 230 and all of the values or settings of the parameters of component monitor 230.

Condition parameter module 232 enables monitoring of various current conditions of a component of computer system, with the conditions obtained from a memory of the component and/or via detection by a sensor of a transponder of the component. Temperature parameter 262 identifies a temperature of the component and/or an air temperature within computer system 100. Power parameter 264 identifies a power (e.g., operating characteristic such as power consumption) of a component, while speed parameter 266 identifies a speed of a component (e.g., fan speed, processing speed, such as 2 Gigahertz). Location parameter 268 identifies a location of a component within computer system, and in some embodiments, represents location information from position-locating elements operating in association with transponders 150, 156 for identifying a location of a component. Humidity parameter 270 identifies a humidity at or near a component on which a humidity sensor is disposed, which can be reflective of a local humidity near the component or a system-wide humidity. Pressure parameter 272 identifies a pressure, such as barometric pressure or mechanical pressure.

Specification parameter module 234 enables identifying information concerning an origin of a component, including its operating characteristics via the origin information. In one embodiment, serial number parameter 280 identifies a serial number of a component and release date parameter 282 identifies a release date of a component, either of which can then be plugged into a database (external to or within computer system 100) to determine a profile of characteristics about the component. Version parameter 284 identifies a version of a component to help identify its characteristics and/or compatibility with other components within computer system. In another embodiment, original equipment manufacturer (OEM) identifier (ID) 286 enables determining whether a component corresponds to an OEM component for that computer system, or instead is a third party or substitute component. This determination is sometimes important in performing maintenance and repair on a computer system, as well as in validating terms and conditions of a warranty, such as a user agreement not to replace components with non-OEM replacement components.

Configuration parameter 288 identifies an overall configuration of a computer system, as well as, which configurations are appropriate for a particular component. This configuration parameter 288 enables confirming that a computer system has a proper combination and arrangement of components to insure that a recently assembled computer system corresponds to a configuration of a computer system as ordered by a customer or as intended by the assembler. This configuration parameter 288 also enables confirming a proper combination and arrangement of components to assist in performing maintenance and repair on a computer system using appropriate components to complete the repair.

In one embodiment, configuration parameter 288 also automatically updates a configuration of the computer system as components are added or removed from computer system 100 since a new component installed in computer system with a transponder 150, 156 will be enabled for communication with transceiver 104 and a component removed from computer system 100 will no longer be able to communicate with transceiver 104. In one embodiment, configuration parameter 288 acts in cooperating with registry 238, as further described below.

In one embodiment, warranty parameter 290 tracks warranty information for a component and/or computer system, so that any recalls, patches, or warranty information for a component is identified via component monitor 230 for upkeep of a component. This feature enables an electronic mechanism to supplement or replace manual determination (e.g., by a technician) of warranty information regarding a component of a computer system.

In addition, the condition parameters and the specification parameters of component monitor 230 can be used together to provide information about a component. For example, a release date parameter 282 can be used to determine an age of a component. Similarly, in other embodiments, a power parameter 264 or speed parameter 266 is determined by or related to a specification parameter 234, such as version parameter 284 or serial number parameter 280, which can be used to reference a database containing the operating characteristics of component having a particular serial number.

Component type parameter 236 tracks the types of components of a computer system, so that as transceiver 104 interrogates a transponder 150, 156 of a respective component, transponder 150, 156 reports to transceiver 104 the type of component (e.g., CPU, memory, power, cooling, etc.) with which transceiver 104 is communicating. In one embodiment, the component type parameter 236 of component monitor 230 enables a computer system manager (e.g., manager 106 of FIG. 3) to determine and confirm a configuration of a computer system by tracking all of the different types of components forming computer system.

Registry 238 tracks the presence of components of computer system 100 to display a listing of which components are being tracked in computer system via the wireless monitoring system. As shown in FIG. 5, in one example, registry 238 lists central processing unit (CPU) 290, cooling unit 292, memory 294, input/output unit 296, board 297 (e.g., circuit board, motherboard, etc.) and other component 298 as components being tracked via wireless monitoring in computer system. In one aspect, registry 238 enables selection of a component to specify which component that other modules (e.g., condition parameter module, specification parameter module) of component monitor will display information about or write information to. In one embodiment, registry 238 acts in cooperation with configuration parameter 288 to track components relative to an overall configuration of the computer system 100, and in other respects previously described in association with configuration parameter 288.

The parameters within component monitor 230 are parameters that are stored within or detected at each component so that component monitor 230 carries out a reporting function of listing values of parameters of components rather than a determining function of setting the value of the parameters of the components.

Figure 6:
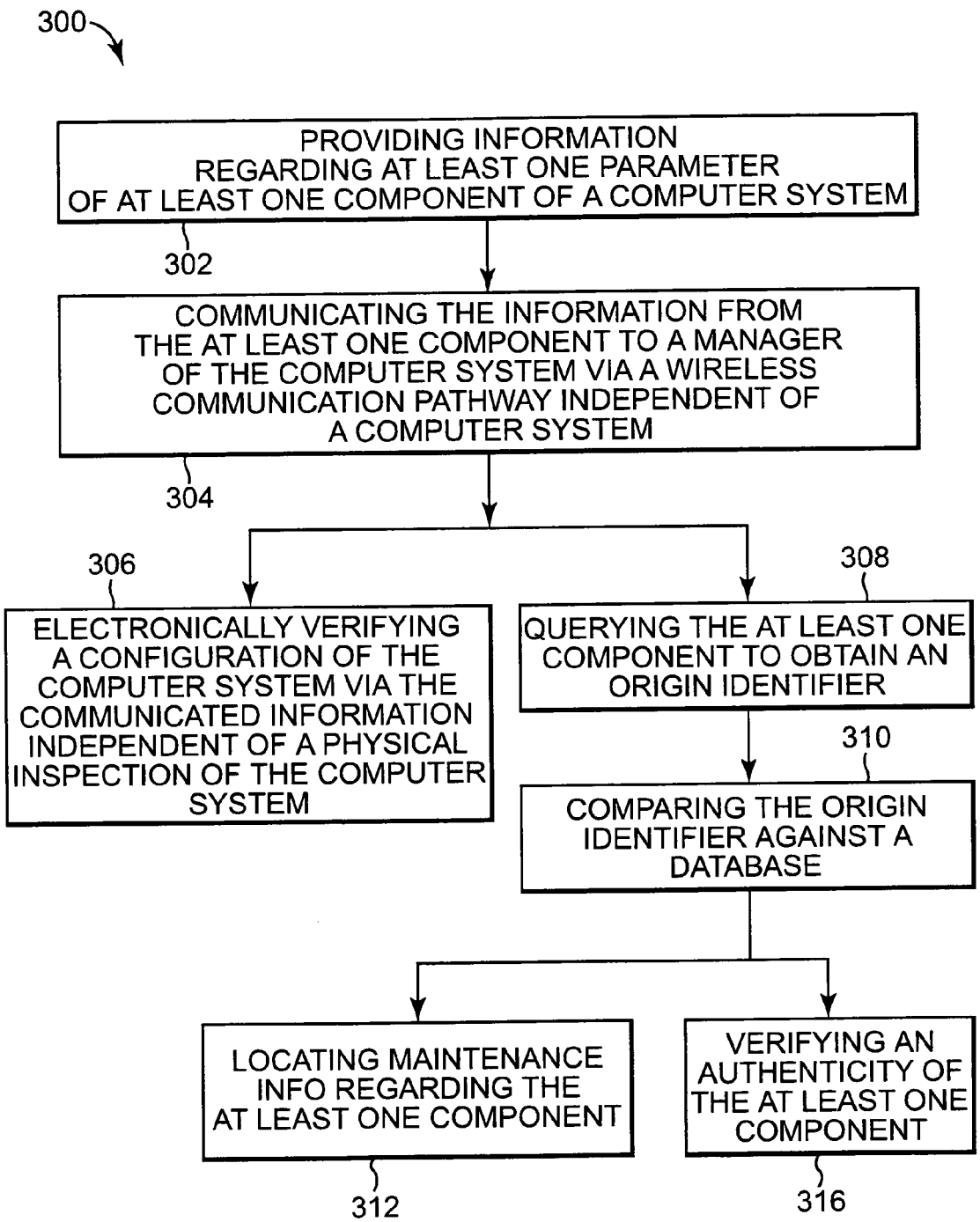
FIG. 6 is a flow diagram of a method of monitoring an electronics system, according to an embodiment of the invention.

FIG. 6 is a flow diagram of a method 300 of monitoring a computer system, according to one embodiment of the invention. In one embodiment, the systems described and illustrated in association with FIGS. 1-5 are used to perform method 300.

As shown in FIG. 6, at 302 method 300 comprises providing information regarding at least one parameter of at least one component of a computer system. At 304, the information is communicated from the at least one component to a manager of the computer system via a wireless communication pathway independent of the components of the computer system. In one embodiment, this wireless communication pathway is embodied in a RFID transceiver associated with the computer system and a RFID transponder associated with selected components of the computer system. The wireless communication takes place between the RFID transceiver and the one or more RFID transponders so that no wires, traces, pins or other portions of components of the computer system are used to enable this communication pathway for monitoring the computer system.

In one embodiment, at 306 method 300 further comprises electronically verifying a configuration of the computer system via the wirelessly communicated information to enable electronic confirmation of a proper configuration of the computer system independent of a physical inspection of the components of the computer system. Of course, a physical inspection of the computer system can still be made by qualified personnel with or without the wireless monitoring system (which electronically checks the configuration of the computer system). This feature, among other features and attributes, insures that a computer system is assembled according to a configuration of components as intended by the assembler and/or as requested by a consumer.

In another embodiment, at 308 method 300 comprises querying the at least one component to obtain an origin identifier of the at least one component. An origin identifier has substantially the same features and attributes of one or more of parameters of specification parameter module 234 of component monitor 230. At 310, the origin identifier of a component is compared against a database of component information to obtain detailed information about parameters of the component. The database can be internal to computer system 100 within manager 106, or external to computer system 100, such as in database 184 of external system 180 (FIG. 3).

In one embodiment, at 312 maintenance information is located in the database (via the origin identifier) regarding the at least one component to enable informed maintenance and repair of component and/or computer system.

In another embodiment, at 316 an authenticity of the at least one component is verified to enable appropriate use of warranty, recall, and/or patch information, as well as to verify user compliance with the terms and conditions of any applicable warranty or repair policy.

Accordingly, a method of monitoring a computer system via a wireless communication pathway enables electronic verification of proper assembly of the computer system and facilitates maintenance and repair of the computer system.

Figure 7:
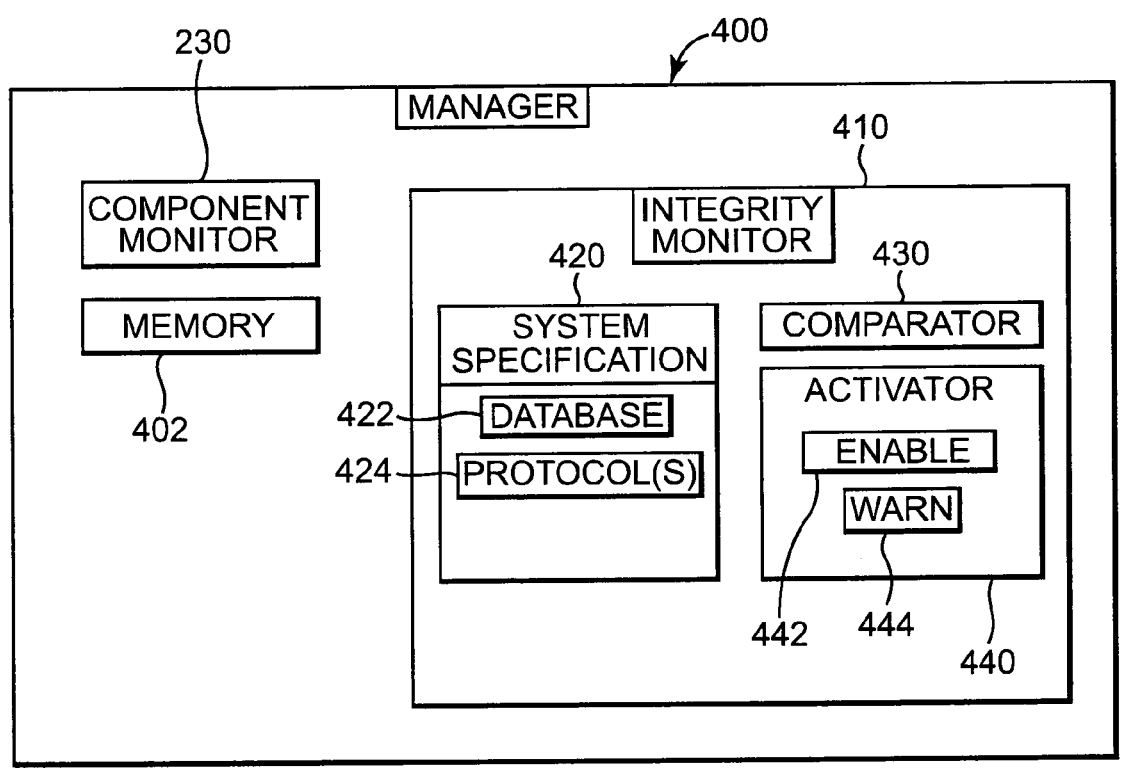
FIG. 7 is a block diagram of an integrity monitor, according to an embodiment of the invention.

FIG. 7 is a block diagram of a manager of an electronics system, according to an embodiment of the invention. In one embodiment, the electronics system comprises a computer system. As shown in FIG. 7, manager 400 comprises memory 402, component monitor 230 (FIG. 5) and integrity monitor 410. Manager 400 and component monitor 230 have substantially the same features and attributes as manager 106 (FIG. 3) and component monitor (FIG. 5) as previously described, except also further including integrity monitor 410. Memory 402 represents a memory in which manager 400 is stored, and in one embodiment comprises a memory forming a portion of computer system 100 or another electronic system.

Integrity monitor 410 enables manager 400 to insure the integrity of the computer system by maintaining compatibility of components of the computer system. This feature is particularly advantageous when replacing components of a computer system with a newer version of the same type of component.

As shown in FIG. 7, integrity monitor 410 comprises system specification module 420 including database 422 and protocol module 424, comparator 430, and activator 440 including enable function 442 and warn function 444. System specification module 420 enables manager 400 to maintain information about the performance or operating specifications of computer system against which performance or operating specifications of a component can be compared. Database 422 maintains performance specifications and/or operating parameters of each component in the computer system, and of the computer system as a whole. Information within database 422 acts as a predetermined criteria of computer system 100 against which parameters of the components are evaluated. Protocol module 424 maintains information about all of the electrical protocols governing compatibility of the components regarding signals, power, etc. to enable evaluating a new component for compatibility with existing protocols implemented in computer system 100. In one embodiment, protocol module 424 includes a power management protocol.

Comparator 430 performs the comparison of parameters of a component with other components of the computer system and/or the computer system as a whole. Activator 440 of integrity monitor 440 controls activation of circuitry and connection pathways of computer system to thereby control operation of a component of the computer system. In one aspect, when activated because a component is determined to be compatible with computer system, enable function 442 enables operation of that component within computer system and also prevents operation of a component when enable function 442 is not activated because of component incompatibility. In one embodiment, enable function 442 controls whether a component receives power or is blocked from receiving power from computer system 100.

Warn function 444 of activator 440 warns a user, via manager 400, of an incompatibility of a component with a computer system. In one embodiment, when a new component is within a proximity of a computer system but not yet physically installed in the computer system, manager 400 determines the compatibility of the component via the wireless RF communication pathway (RFID transceiver and RFID transponder). If there is an incompatibility, then warn function 444 warns an operator not to install the component in the computer system. If the component is suitably compatible for placement in computer system, then warn function is not activated. Alternatively, warn function can be replaced by a clear function which identifies to the operator that the component is compatible by displaying a clear message, and when a component is incompatible, not displaying a clear message.

Figure 8:
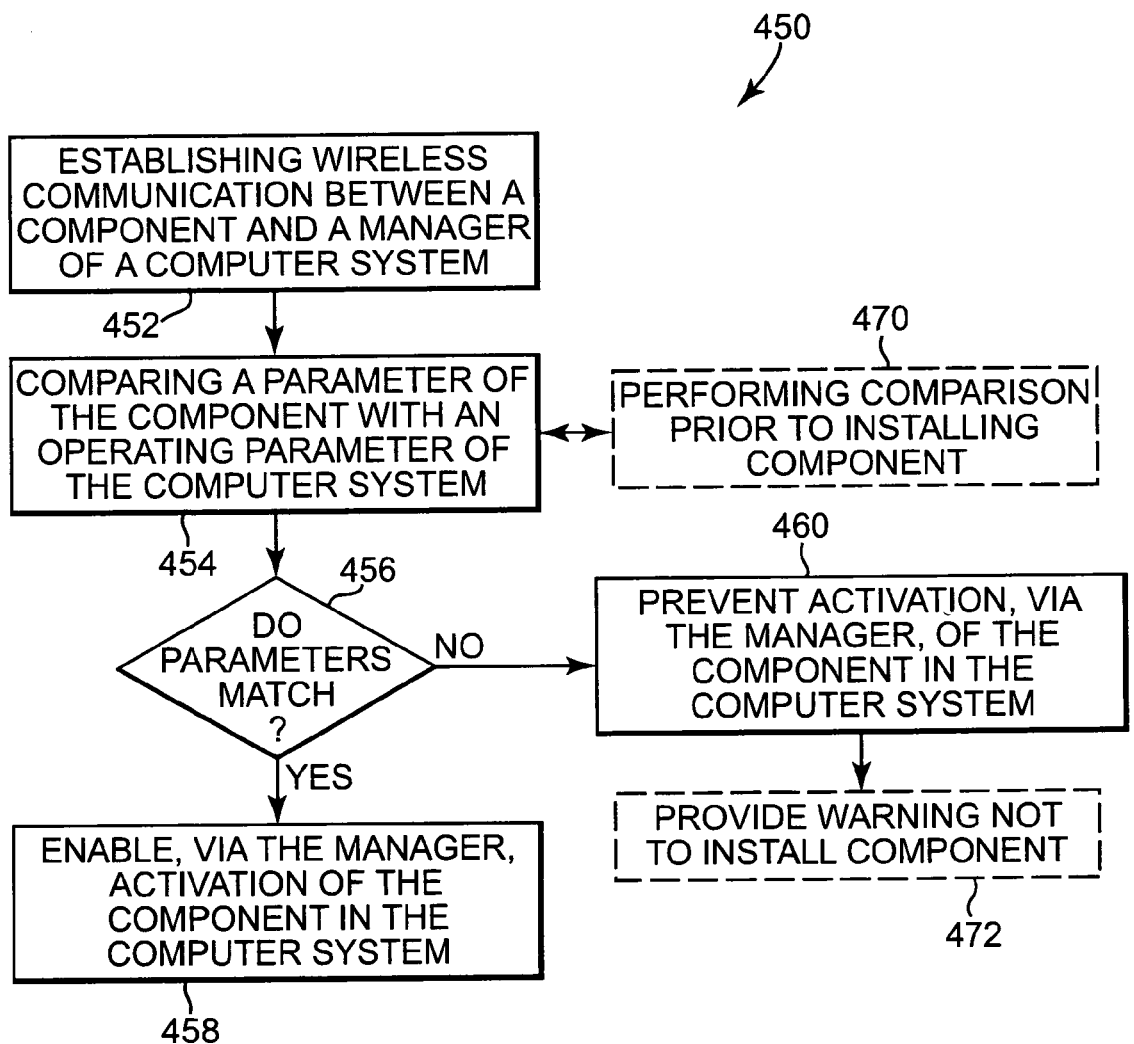
FIG. 8 is a flow diagram of a method of monitoring component compatibility in an electronics system, according to an embodiment of the invention.

FIG. 8 is a flow diagram of a method of monitoring compatibility of components of a computer system. As shown in FIG. 8, at 452 method 450 comprises establishing wireless communication between a component and a manager of a computer system. At 454, a parameter of the component is compared to an operating parameter of the computer system. At 456, if the parameters match or are suitably compatible, then at 458, manager enables activation of the component in the computer system. If the parameters do not match or are not suitable compatible, then the manager prevents activation of the component in the computer system.

In one embodiment, at 470, the comparison of a parameter of the component and parameters of the computer system is performed prior to physically installing the component into the computer system. In one aspect, at 472, the manager produces a warning to an operator or installer of component incompatibility thereby preventing the installation of an incompatible component. In another aspect, this warning also can produced when the compatibility comparison is made after physically installation of the component in the computer system.

Embodiments of the invention greatly simplify the task of implementing a monitoring system into an electronics system, such as a computer system, by effectively permitting the overlay of wireless communication mechanisms outside of the normal functions and operations of the components of the electronics system. In particular, an RFID transponder tag with a sensor is secured to a conventional industry standard component that does not have an integrated sensor(s). This implementation allows the use of low-cost components and avoids the cost and complexity of integrating sensors into these components. Parameters of each component, which are stored at the component or detected at the component, are communicated to a manager of the electronics system. These features alleviate tedious physical inspections of an electronics system, and enhance the efficiency of maintenance and repair of an electronics system.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer comprising:
a frame supporting computer circuitry and supporting a first wireless RFID communicator associated with the computer circuitry;
at least one computer component removably installable within the computer and configured to electrically interact with, and as part of, the computer circuitry, wherein the computer circuitry cannot function without the at least one computer component, wherein the at least one computer component including a second wireless RFID communicator, and wherein the at least one computer component comprises at least one of a central processing unit, a power unit, or a cooling unit; and
a manager in wired communication with the first wireless RFID communicator and including a comparator module configured for determining a compatibility of the at least one computer component with the computer circuitry, via wireless communication between the first wireless RFID communicator and the second wireless RFID communicator, by comparing at least one of a speed parameter or a power parameter of the at least one computer component with a predetermined criteria regarding the computer circuitry prior to physical installation of the at least one computer component within the computer.

2. The computer of claim 1 wherein the manager comprises an activator module configured to selectively enable operation of the at least one computer component with the computer circuitry based on the compatibility determined by the comparator module.

3. The computer of claim 2 wherein the activator module comprises a warn function for producing a warning that the at least one computer component is not compatible with the computer circuitry.

4. The computer of claim 1 wherein the comparator module performs the comparison of the at least one parameter of the at least one computer component with the predetermined criteria of the computer circuitry via a system specification module of the computer that includes a database of information about the computer circuitry and the at least one computer component.

5. The computer of claim 1, and further comprising:
an external computer system in communication with the computer and including an external manager configured to assist the manager of the computer in managing compatibility of the at least one computer component with the computer.

6. A method of insuring component compatibility in a computer system, the method comprising:
establishing a RFID wireless communication pathway between at least one component of a computer system and a manager of the computer system, the RFID wireless communication pathway being independent of a wired communication path between the at least one component and the computer system;
comparing, via the RFID wireless communication pathway, at least one parameter of the component with at least one operating parameter of the computer system including performing the comparison prior to physically installing the at least one component into the computer system; and
selectively enabling, via the manager, activation of the at least one component within the computer system based upon a result of the comparison of the at least one parameter and the at least one operating parameter, wherein the computer system cannot function without the at least one component, and
wherein selectively enabling includes not physically installing the at least one component into the computer system when the comparing reveals an incompatibility of the at least one component with the computer system.

7. The method of claim 6 wherein the at least one component includes a RFID transponder configured to store in memory the at least one parameter of the at least one component as at least one of:
a speed parameter; or
a power parameter.

8. The method of claim 6 wherein selectively enabling the component comprises:
communicating a warning via the manager to avoid physically installing the component and to avoid activating the computer system with the at least one component physically installed in the computer system.

9. The method of claim 6 wherein comparing the at least one parameter comprises:
querying the at least one component via the RFID wireless communication pathway to obtain information about the at least one parameter, wherein the at least one parameter comprises an origin identifier of the at least one component; and
comparing the origin identifier of the at least one component against a database to obtain specifications of the at least one component for comparison against the operating parameter of the computer system.

10. A computer readable medium having computer-executable instructions for performing a method of insuring component compatibility in a computer, the method comprising:
establishing a RFID wireless communication pathway between a computer component of a computer and a manager of the computer, the RFID wireless communication pathway being independent of a wired communication path between the computer component and the computer;
comparing, via the RFID wireless communication pathway, at least one parameter of the computer component with at least one operating parameter of the computer including performing the comparison prior to physical installation of the at least one computer component into the computer; and
selectively enabling, via the manager, activation of the at least one computer component within the computer system based upon a result of the comparison of the at least one parameter and the at least one operating parameter, including not physically installing the at least one component into the computer system when the comparing reveals an incompatibility of the at least one component with the computer system.

11. The medium of claim 10 wherein comparing the at least one parameter comprises:
querying the at least one computer component via the RFID wireless communication pathway to obtain information about the at least one parameter, wherein the at least one parameter comprises an origin identifier of the at least one computer component; and
comparing the origin identifier of the at least one computer component against a database to obtain specifications of the at least one computer component for comparison against the operating parameter of the computer.

* * * * *